United States Patent [19]

Nishikawa et al.

[11] Patent Number: 4,847,156
[45] Date of Patent: Jul. 11, 1989

[54] MAGNETIC RECORDING MEDIUM

[75] Inventors: Yasuo Nishikawa; Akihiro Matsufuji; Kenichi Masuyama; Yutaka Kakuishi, all of Kanagawa, Japan

[73] Assignee: Fuji Photo Film Co., Ltd., Kanagawa, Japan

[21] Appl. No.: 110,401

[22] Filed: Oct. 20, 1987

[30] Foreign Application Priority Data

Oct. 20, 1986 [JP] Japan .................. 61-248965
Oct. 20, 1986 [JP] Japan .................. 61-248966

[51] Int. Cl.$^4$ ................................. G11B 5/70
[52] U.S. Cl. ..................... 428/425.9; 428/694; 428/695; 428/900
[58] Field of Search ............ 428/694, 695, 522, 425.9

[56] References Cited

U.S. PATENT DOCUMENTS

| | | | |
|---|---|---|---|
| 4,652,500 | 3/1987 | Ejiri | 428/900 |
| 4,666,784 | 5/1987 | Imukai | 428/425.9 |
| 4,690,864 | 9/1987 | Funahashi | 428/900 |
| 4,701,372 | 10/1987 | Akiyama | 428/900 |

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having thereon a magnetic layer containing (a) ferromagnetic particles, (b) a binder containing at least one resin substituted with at least one polar group selected from an —SO$_3$M group, a —COOM group, an —OSO$_3$M group, an

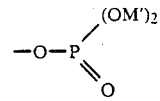

group and a

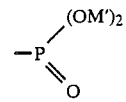

group, wherein M represents H, Li, Na or K and M' represents H, Li, Na, K or an alkyl group, and (c) at least one fatty acid lubricating agent comprising at least one fatty acid derivative represented by formula (I):

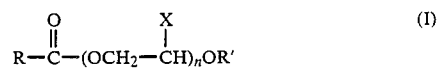

in which R represents a hydrocarbon group having from 11 to 21 carbon atoms, X represents hydrogen or a methyl group, R' represents a hydrocarbon group having from 1 to 8 carbon atoms and n is an integer of from 2 to 20.

17 Claims, No Drawings

MAGNETIC RECORDING MEDIUM

FIELD OF THE INVENTION

The present invention relates to a magnetic recording medium, and more particularly it relates to a magnetic recording medium having improved electromagnetic properties, magnetic properties and durability.

BACKGROUND OF THE INVENTION

Higher density recording is now required for magnetic recording media, and one approach of smoothing the surface of a magnetic layer is known.

As a result of smoothing the surface of a magnetic layer, however, the friction coefficient of contact between the magnetic layer and running system increases while a magnetic recording medium runs, damaging the magnetic layer or causing it to peel apart in a short period of time.

Particularly, a video tape is often used under harsh conditions, such as in a still mode. In this case, ferromagnetic particles readily separate from a magnetic layer, causing head gap bridging.

In order to improve the running durability of a magnetic layer, it has been suggested to add abrasive agents (hard particles) such as corundum, carbon silicate or chromium oxide to a magnetic layer, although a relatively large amount thereof must be added to provide abrasive effects.

However, the addition of a large amount of abrasive agents is unfavorable, since such a magnetic layer having a large amount of abrasive agents causes remarkable magnetic head wear and has reduced smoothness, which is undesirable since a magnetic layer is smoothed to improve electromagnetic properties.

It has also been suggested in U.S. Pat. No. 4,322,474 that a fatty acid or an ester of a fatty acid and an aliphatic alcohol be added to a magnetic layer with lubricating agents to reduce its friction coefficient.

As use of portable video tape recorders and flexible disk drive apparatuses for a personal computer has spread recently, magnetic recording media are increasingly used under various conditions, such as low temperature or high temperature and high humidity. Accordingly, the running durability of a magnetic recording medium should not fluctuate, but should remain stable even under various conditions. Conventionally used lubricating agents are insufficient to provide such running durability.

With the rapid reduction in size of magnetic recording media, particularly video tapes and floppy disks attained by compressing recording wavelengths and track width, smaller ferromagnetic alloy particles are used more often than ferromagnetic particles of iron oxide type, conventionally used as materials for magnetic particles.

As magnetic particle size is made smaller, comparatively better electromagnetic properties can be obtained, but it is difficult to simultaneously improve durability.

In order to solve the above problem, it has been suggested in Japanese Patent Application (OPI) No. 227030/84 (the term "OPI" as used herein refers to a "published unexamined Japanese patent application") and in Japanese Patent Publication No. 46128/82 that as a lubricating agent, diethylene glycol ester derivatives be used in combination with binders of urethane type, vinyl chloride type or epoxy type.

The use of diethylene glycol ester derivatives, alone or in combination with olive oil, can improve durability at high temperatures, but $\mu$ values after repeated running at low temperature and low humidity increase and head gap bridging occurs at low humidity.

That is, such lubricating agents cannot maintain their lubricating effect at low temperature or at low humidity, and are insufficient with respect to electromagnetic properties such as S/N and magnetic properties such as squareness ratio.

Further, when these lubricating agents are used in combination, head gap bridging takes place at high humidity, and $\mu$ values (friction coefficient) increase after running repeatedly at room temperature.

SUMMARY OF THE INVENTION

An object of the present invention is to provide a magnetic recording medium having improved electromagnetic properties such as S/N ratio.

Another object of the present invention is to provide a magnetic recording medium having improved durability such as a superior friction coefficient ($\mu$ value) after repeated runs at low temperatures or room temperature and low humidity.

A further object of the present invention is to provide a magnetic recording medium that does not cause head gap bridging at high humidity.

Accordingly, in this connection, as a result of thorough investigation as to the composition of lubricating agents, it has now been found that these and other objects of the present invention are attained by a predetermined particular combination of lubricating agents and binders.

The present invention relates to a magnetic recording medium comprising a non-magnetic support having thereon a magnetic layer containing (a) ferromagnetic particles; (b) a binder containing at least one resin substituted with at least one polar group selected from an $-SO_3M$ group, a $-COOM$ group, an $-OSO_3M$ group, an

group and a

group, in which M represents H, Li, Na or K, and M' represents H, Li, Na, K, or an alkyl group; and (c) at least one fatty acid lubricating agent comprising at least one fatty acid derivative represented by the following formula (I):

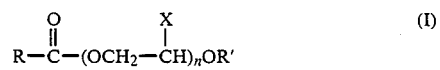

wherein R represents a hydrocarbon group having from 11 to 21 carbon atoms, X represents hydrogen or a methyl group, R' represents a hydrocarbon group having from 1 to 8 carbon atoms and n is an integer of from 2 to 20.

DETAILED DESCRIPTION OF THE INVENTION

The magnetic recording medium of the present invention comprises a non-magnetic support having provided thereon a magnetic layer containing ferromagnetic particles, binders and fatty acid derivatives represented by formula (I) (hereinafter "fatty acid derivative").

The non-magnetic supports used in the present invention are those conventionally used.

The materials for forming a non-magnetic support include, for example, various films of synthetic resins such as polyethylene terephthalate, polypropylene polycarbonate, polyethylene naphthalate, polyamide, polyamide imide or polyimide and metal foils such as aluminum foil or stainless steel foil. The non-magnetic support generally has a thickness of from about 3 to 50 $\mu$m and preferably from about 5 to 30 $\mu$m.

The non-magnetic support may have a backing layer on the opposite surface of a magnetic layer.

It is necessary that the magnetic layer of the magnetic recording medium of the present invention contain at least one fatty acid derivative represented by formula (I). And further the magnetic layer may contain a long chain fatty acid. The fatty acid derivative represented by formula (I) and/or a long chain fatty acid may be homogeneously dispersed in the magnetic layer or can be present on the surface of the magnetic layer. Any fatty acid derivatives represented by formula (I) can be used in the present invention. In formula (I), R represents a hydrocarbon group having from 11 to 21 carbon atoms and preferably from 13 to 17 carbon atoms. The hydrocarbon group may be a saturated or unsaturated, a straight chain or branched chain hydrocarbon group. Among these, a saturated straight chain hydrocarbon group is preferred. X represents hydrogen or a methyl group and preferably hydrogen. R' represents a hydrocarbon group having from 1 to 8 carbon atoms and preferably from 1 to 6 carbon atoms. The hydrocarbon group may be a saturated or unsaturated, a straight chain or branched chain hydrocarbon group. Among these, a saturated straight chain hydrocarbon group is preferred. n represents an integer of from 2 to 20 and particularly preferably from 2 to 4. Such fatty acid derivatives include, for example, the following compounds, but the present invention is not to be construed as being limited thereto.

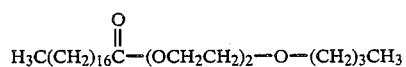

Compound 1

Compound 2

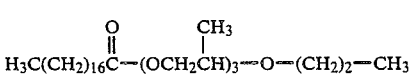

Compound 3

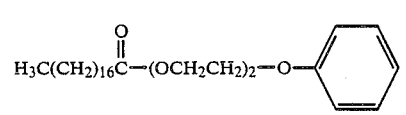

Compound 4

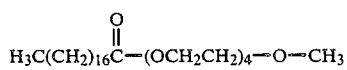

Compound 5

-continued

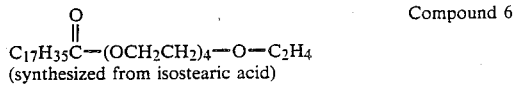

Compound 6

(synthesized from isostearic acid)

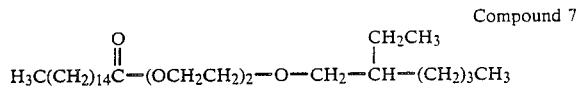

Compound 7

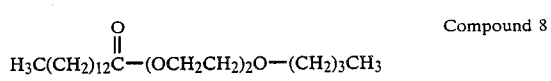

Compound 8

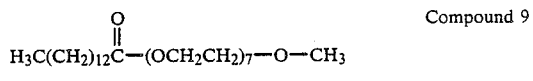

Compound 9

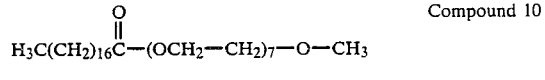

Compound 10

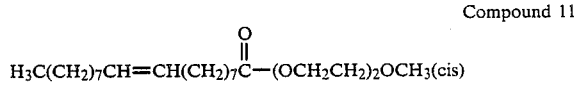

Compound 11

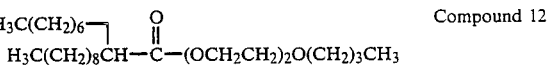

Compound 12

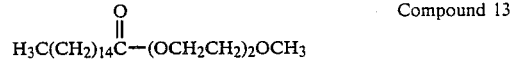

Compound 13

The most effective fatty acid derivatives among the above derivatives are those wherein R in the general formula is a straight chain hydrocarbon group, X is preferably hydrogen and n is particularly preferably from 2 to 4.

When n is 5 or higher, it is difficult to obtain pure derivatives. Generally in the present invention, compounds of formula (I) are present as a mixture of compounds in which n is distributed over a range, and this presents no problem.

As a fatty acid as a raw material is a natural acid, in the compounds represented by formula (I) the R moiety can contain the same number of carbon atoms, or the different R moieties can contain different numbers of carbon atoms. The resulting friction coefficient is better if a combination of compounds represented by formula (I) is used in which the R moieties contain different numbers of carbon atoms, rather R moieties containing the same number of carbon atoms. For example, it is clear that when $H_3C(CH_2)_{16}CO(OCH_2CH_2)_2O(CH_2)_4CH_3$ and $H_3C(CH_2)_{14}CO(OCH_2CH_2)_2O(CH_2)_4CH_3$ are used in combination in a mixing ratio of, for example, ½ to 2/1, rather than used alone respectively, the friction coefficient is better.

The long chain fatty acid which may be used together with the fatty acid derivatives represented by formula (I) is a fatty acid having from 11 to 32 carbon atoms, preferably from 12 to 22 carbon atoms. The long chain fatty acid as used herein includes saturated and unsaturated straight chain fatty acids. A saturated fatty acid is more preferred than an unsaturated fatty acid to reduce the friction coefficient. A branched fatty acid, such as isostearic acid or 2-heptyl undecanoic acid can also be used. Specific examples of suitable long chain fatty acid are shown as follows, but the present invention is not limited thereto.

| Long Chain Fatty Acids (typical acid having a straight chair structure) Saturated Fatty Acids $CH_3(CH_2)_nCOOH$ | | | |
|---|---|---|---|
| Name | Formula | Boiling Point (°C.) | Melting Point (°C.) |
| Undecylic acid | $C_{10}H_{21}COOH$ | 164 (15 mmHg) | 28.6 |
| Lauric acid | $C_{11}H_{23}COOH$ | 225 (100 mmHg) | 44 |
| Tridecylic acid | $C_{12}H_{25}COOH$ | 200 (24 mmHg) | 45.5 |
| Myristic acid | $C_{13}H_{27}COOH$ | 199 (16 mmHg) | 58 |
| Pentadecylic acid | $C_{14}H_{29}COOH$ | 257 (100 mmHg) | 53 to 54 |
| Palmitic acid | $C_{15}H_{31}COOH$ | 215 (15 mmHg) | 63 to 64 |
| Heptadecylic acid | $C_{16}H_{33}COOH$ | 227 (100 mmHg) | 60 to 61 |
| Stearic acid | $C_{17}H_{35}COOH$ | 232 (15 mmHg) | 71.5 to 72 |
| Nonadecanoic acid | $C_{18}H_{37}COOH$ | 227 to 230 (10 mmHg) | 68.7 |
| Arachic acid | $C_{19}H_{39}COOH$ | 203 to 205 (1 mmHg) | 77 |
| Behenic acid | $C_{21}H_{43}COOH$ | 262 to 265 (15 mmHg) | 81 to 82 |
| Lignoceric acid | $C_{23}H_{47}COOH$ | | 83.5 |
| Cerotic acid | $C_{25}H_{51}COOH$ | | 87.9 |
| Heptacosanoic acid | $C_{26}H_{53}COOH$ | | 82 |
| Motanic acid | $C_{28}H_{57}COOH$ | | 89.3 |
| Melissic acid | $C_{29}H_{59}COOH$ | | 93.5 to 94 |
| Lacceric acid | $C_{31}H_{63}COOH$ | | 95 |

| Long Chain Fatty Acids Unsaturated Fatty Acids | | | | |
|---|---|---|---|---|
| Name | Formula | Position[1] of Unsaturated Bond | Boiling Point (°C.) | Melting Point (°C.) |
| Undecylenic acid | $CH_2=CH(CH_2)_8COOH$ | 10 | 165 (15 mmHg) | 24.5 |
| Oleic acid | $C_{17}H_{33}COOH(cis)$ | 9 | 203 to 205 (5 mmHg) | 16 |
| Elaidic acid | $C_{17}H_{33}COOH(trans)$ | 9 | 234 (15 mmHg) | 44 to 45 |
| Cetoleic acid | $C_{21}H_{41}COOH$ | 11 | — | 33.7 |
| Erucic acid | $C_{21}H_{41}COOH(cis)$ | 13 | 243 (5 mmHg) | 33.5 to 34 |
| Brassidic acid | $C_{21}H_{41}COOH(trans)$ | 13 | 282 (30 mmHg) | 61.5 |
| Linolic acid | $C_{17}H_{31}COOH (F_2)$ | 9, 12 | 228 (14 mmHg) | −5 |
| Linolenic acid | $C_{17}H_{29}COOH (F_3)$ | 9, 12, 15 | 197 (4 mmHg) | −11 |
| Arachidonic acid | $C_{19}H_{31}COOH (F_4)$ | 5, 8, 11, 14 | — | −49.5 |
| Stearolic acid | $C_{17}H_{31}COOH (F'_1)$ | 9 | | 47 to 48 |

(Notes)
[1]It is the position of the unsaturated bond (double bond or triple bond) counted from the carbon in COOH, when the carbon in COOH is numbered as 1.
F, F' are signs of double bond and triple bond respectively, and numerals indicate a total number of double bond or triple bond.

It is preferred in view of simple manufacturing process that the fatty acid derivative represented by formula (I) and long chain fatty acid are incorporated in a magnetic layer, and they can also be top-coated on a magnetic layer as a coating solution. When they are incorporated into a magnetic coating solution, the total amount of these compounds is preferably from about 0.01 wt % to 10.0 wt %, more preferably from about 0.05 wt % to 6 wt %, based on ferromagnetic particles. When they are coated as a top-coating layer, they are used in an amount of from about 10 to 500 mg/m² and preferably from about 20 to 200 mg/m².

The mixing weight ratio of the fatty acid derivative and the long chain fatty acid is from about 100/0 to 10/90 and preferably from about 70/30 to 30/70.

In addition to the lubricating agents disclosed above, the recording medium can contain lubricants, including higher alcohols; esters such as butyl stearate or sorbital oleate of monobasic fatty acids having from 12 to 20 carbon atoms and mono- or polyhydric alcohols having from 3 to 20 carbon atoms; mineral oils; animal and vegetable oils; olefinic low polymers; fatty acid amides; silicon oils; modified silicon oils; conventionally known lubricating agents such as graphite fine particles, molybdenum disulfide fine particles or tetrafluoroethylene polymer fine particles; and lubricating agents for plastics. An amount of the other lubricating agents is generally from 0.1 to 2.0 wt % based on ferromagnetic particles.

The preferred binders used in the present invention are polyurethane resins, copolymers of vinyl chloride and other monomers, and polyester resins, each containing a monomer component having at least one —$SO_3M$ group, —COOM group, —$OSO_3M$ group,

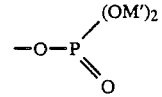

group, or

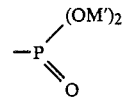

group, where M represents H, Li, Na or K and M' represents H, Li, Na, K or an alkyl group.

Vinyl chloride copolymers, polyurethane resins and polyester resins are now described in detail.

It is particularly preferred that the vinyl chloride copolymers contain a repeating unit of vinyl chloride, a repeating unit having an epoxy group and a repeating unit having the above-described polar group.

The repeating unit having a polar group is a repeating unit substituted with —$SO_3M$, —$OSO_3M$, —COOM and —$PO(OM')_2$ where M and M' have the same definition as above. Vinyl chloride copolymers may have a single polar group or may have two or more polar groups in combination.

Among those, vinyl chloride copolymers containing a repeating unit having —$SO_3Na$ as a polar group are preferred.

The content of the repeating unit having a polar group in copolymers is generally from about 0.01 to 5.0 mol %, and preferably from about 0.5 to 3.0 mol %.

The content of the repeating unit having an epoxy group in such copolymers is generally from about 1.0 to 30 mol %, and preferably from about 1 to 20 mol %. The vinyl chloride copolymers generally contain a repeating unit having an epoxy group in an amount of generally from about 0.01 to 0.5 mol, and preferably from about 0.01 to 0.3 mol, per mol of the repeating vinyl chloride unit.

When the content of the repeating unit having an epoxy group is less than 1 mol %, or when the amount of the repeating unit having an epoxy group is less than 0.01 mol per mol of the repeating vinyl chloride unit, it often happens that hydrochloric acid gas discharged from the vinyl chloride copolymers cannot effectively be prevented. On the other hand, when the content of the repeating unit having an epoxy group is more than 30 mol %, or when the amount of the repeating unit having an epoxy group is more than 0.5 mol per mol of the repeating vinyl chloride unit, the vinyl chloride copolymers have a low hardness in many cases. When such copolymers having a low hardness are used, the running durability of a magnetic layer is decreased.

When the content of the repeating unit having a polar group is less than 0.01 mol %, the dispersibility of ferromagnetic particles is sometimes insufficient, and when it is more than 5.0 mol %, the vinyl chloride copolymers have hygroscopicity, thereby reducing its weather resistance.

Such vinyl chloride copolymers typically have a number average molecular weight of generally from about 15,000 to 60,000 and preferably from 20,000 to 50,000.

The vinyl chloride copolymers having an epoxy group and a predetermined polar group can be prepared, for example, by the following method.

The vinyl chloride copolymers having, for example, an epoxy group and an —$SO_3Na$ group as a polar group can be prepared by mixing sodium 2-(meth)acrylamide-2-methylpropane sulfonate having a reactive double bond and —$SO_3Na$ as a polar group (monomer) with diglycidyl acrylate at a low temperature, and polymerizing this mixture with vinyl chloride under pressure at 100° C. or less.

In addition to sodium 2-(meth)acrylamide-2-methylpropane sulfonate, examples of monomers having a reactive double bond that can be used for introducing a polar group and the polar group thereof include 2-(meth)acrylamide-2-methylpropane sulfonic acid, vinyl sulfonic acid and their sodium or potassium salts; ethyl (meth)acrylic acid-2-sulfonate and its sodium salt or potassium salt; maleic anhydride, methacrylic acid and (meth)acrylic acid-2-phosphate.

Glycidyl(meth)acrylate is generally used as a monomer having a reactive double bond and en epoxy group for introducing an epoxy group.

In addition to the above synthetic method, vinyl chloride can be polymerized with vinyl alcohol to prepare a vinyl chloride copolymer having polyfunctional —OH group, and reacting (dehydrochloric acid reaction) the resulting copolymer with the following compound having a polar group and a chlorine atom to introduce the polar group into the copolymer.

$ClCH_2CH_2SO_3M$,
$ClCH_2CH_2OSO_3M$,
$ClCH_2COOM$,
$ClCH_2PO(OM')_2$

In the above formulae, M and M' have the same definition as above.

Epichlorohydrin is suitably used for introducing an epoxy group by a dehydrochloric acid reaction.

The vinyl chloride copolymers may contain other monomers. Examples of such comonomers include vinyl ethers such as methyl vinyl ether, isobutyl vinyl ether or lauryl vinyl ether; α-monoolefins such as ethylene or propylene; acrylates such as (meth)acrylate having a functional group (e.g., methyl (meth)acrylate and hydroxyethyl(meth)acrylate); unsaturated nitriles such as (meth)acrylonitrile; aromatic vinyls such as styrene or α-methyl styrene; and vinyl esters such as vinyl acetate or vinyl propionate. When other monomers are used, the monomers are generally present in an amount of up to about 20 parts by weight based on the total weight of the vinyl chloride copolymers.

Methods for introducing a polar group into vinyl chloride copolymers are disclosed in Japanese Patent Application (OPI) Nos. 44227/82, 108032/83, 8127/84, 101161/85, 235814/85, 238306/85, 238309/85 and 238371/85. The present invention can utilize the methods disclosed therein.

The repeating units having a polar group in polyurethane resins used in the present invention contain —$SO_3M$, —$OSO_3M$, —$COOM$ or —$OPO(OM')_2$, where M and M' have the same definition as above. They can be used alone or in combination.

Among those, polyurethane resins having a repeating unit having —$SO_3Na$ are most preferred. It can be prepared, for example, by the following method.

A polyurethane resin is generally prepared by the reaction of polyisocyanate compounds with a polyol component. A polyester polyol which can be obtained by the reaction of a polyol with a polybasic acid is generally used as a polyol component.

The polyurethane resins used in the present invention are obtained by preparing a polyester polyol having a predetermined polar group from a polybasic acid having the predetermined polar group, and then reacting the thus-obtained polyester polyol with a polyisocyanate compound.

Examples of polybasic acids having a polar group include 5-sulfoisophthalic acid, 2-sulfoisophthalic acid, 4-sulfophthalic acid, 3-sulfophthalic acid, dialkyl 5-sulfophthalate, dialkyl 2-sulfoisophthalate, alkyl 4-sulfophthalate, alkyl 3-sulfophthalate and their sodium or potassium salts.

The above-described reaction is well known in U.S. Pat. Nos. 4,152,485 and 4,503,918, and the resin binder of the present invention can be prepared in accordance with the above method.

Examples of a polyol component include trimethylolpropane, hexanetriol, glycerin, trimethylolethane, neopentyl glycol, pentaerythritol, ethylene glycol, propylene glycol, butylene glycol and diethylene glycol.

Examples of dicarboxylic acids in polybasic acids include phthalic acid, isophthalic acid, terephthalic acid, adipic acid, dimerized linolenic acid, sebacic acid and maleic acid.

The thus-obtained polyester polyol having a predetermined polar group has a number average molecular weight of generally from about 500 to 8,000.

Examples of polyisocyanate compounds include a reaction product of 1 mol of trimethylol propane and 3 mols of diisocyanate such as diphenylmethane-4,4'-diisocyanate, tolylene diisocyanate or xylylene diisocyanate; biuret adduct compounds of 3 mols of hexamethylene diisocyanate; isocyanurate adduct compounds of 5 mols of tolylene diisocyanate; isocyanurate adduct compounds of 3 mols of tolylene diisocyanate and 2 mols of hexamethylene diisocyanate; and polymers of diphenylmethane diisocyanate.

The reaction conditions are adjusted so that the polyurethane resins generally have a number average molecular weight of from about 10,000 to 200,000 (preferably from about 15,000 to 60,000).

Further, the method for introducing a polar group into a polyurethane resin other than the above method comprises, for example, preparing a polyurethane resin having polyfunctional —OH group, and then reacting (dehydrochloric acid reaction) the thus-prepared polyurethane resin with the following compounds having a polar group and chlorine.

$ClCH_2CH_2SO_3M$,
$ClCH_2CH_2SO_3M$,
$ClCH_2COOM$,
$ClCH_2PO(OM')_2$

In the above formulae, M and M' have the same definition as above.

The content of the repeating unit having a polar group in the polyurethane resins is generally from about 0.01 to 5 mol %, and preferably from about 0.1 to 2.0 mol %.

Suitable methods for introducing a polar group into a polyurethane resin are disclosed in Japanese Patent Publication Nos. 157603/79 and 41565/83 and Japanese Patent Application (OPI) Nos. 92422/82 and 92423/82. The present invention can employ any of the above methods.

The binders in a magnetic layer of the present invention contain the above vinyl chloride copolymers and polyurethane resins, alone or in combination. When used in combination, it is preferred that the mixing weight ratio of vinyl chloride copolymers and polyurethane resins is from about 85/15 to 10/90, preferably from about 70/30 to 30/70.

By using a vinyl chloride copolymer having a predetermined polar group and epoxy group, and a polyurethane resin having a predetermined polar group, the polar groups of the vinyl chloride copolymer and/or polyurethane resin function to improve the affinity of the binder with ferromagnetic particles. Accordingly, the ferromagnetic particles are sufficiently dispersed in a magnetic layer, thereby improving the squareness ratio of the magnetic layer, and also the reproduced output. Ferromagnetic particles are well dispersed, and lumps of ferromagnetic particles in a dispersion are reduced. Therefore, ferromagnetic particles do not separate while running, and head gap bridging of a magnetic head can be reduced. Head gap bridging is remarkably reduced at a high humidity when fatty acid derivatives represented by formula (I) are used in combination. However, the reason for this is unclear.

The content of the polar group is preferably from about $1 \times 10^{-5}$ to $100 \times 10^{-5}$ mol/g and preferably from about $2 \times 10^{-5}$ to $20 \times 10^{-5}$ mol/g, based on the total weight of binders, and can be slightly varied depending upon the kinds of polar groups present.

In addition to the above-described vinyl chloride copolymers, polyurethane resins and polyester resins, the following resins can be used as a binder. Examples of resins that can be mixed with the above binders include copolymers of vinyl chloride and vinyl acetate; copolymers of vinyl chloride, vinyl acetate, vinyl alcohol and maleic acid; copolymers of vinyl chloride, vinyl acetate, vinyl alcohol and acrylic acid; copolymers of vinyl chloride, vinyl acetate, vinyl alcohol, maleic acid and acrylic acid; copolymers of vinyl chloride and vinylidene chloride; copolymers of vinyl chloride and acrylonitrile; copolymers of ethylene and vinyl acetate; cellulose derivatives such as nitrocellulose resins; acrylic resins; polyvinyl acetal resins; polyvinyl butyral resins; epoxy resins; phenoxy resins; polyurethane resins; and polycarbonate polyurethane resins.

The total binder content in a magnetic layer of a magnetic recording medium of the present invention is from about 10 to 100 parts by weight, and preferably from about 20 to 40 parts by weight, based on 100 parts by weight of ferromagnetic particles.

The ferromagnetic particles used in the present invention are not particularly limited, and ferromagnetic alloy particles, ferromagnetic metal particles, $\gamma\text{-}Fe_2O_3$, $Fe_3O_4$, Co-modified iron oxide, $CrO_2$, modified barium ferrite and modified strontium ferrite can be used.

The shape of ferromagnetic particles is not particularly limited, and an acicular shape, a granular shape, a cubic shape, an ellipsoidal shape and a tabular shape can be used. The ferromagnetic particles preferably have a specific surface area $S_{BET}$ of about 30 $m^2/g$ or more, and when ferromagnetic particles are ferromagnetic metal particles, the specific surface area is preferably about 45 $m^2/g$ or more in view of desirable electromagnetic properties.

It is preferred that the magnetic layer of the magnetic recording medium of the present invention contain inorganic particles having a Mohs' hardness of about 5 or more as an abrasive agent.

Examples of inorganic particles having a Mohs' hardness of at least 5 include $Al_2O_3$ (Mohs' hardness 9), TiO (6), $TiO_2$ (6.5), $SiO_2$ (7), $SnO_2$ (6.5), $Cr_2O_3$ (9) and $\alpha\text{-}Fe_2O_3$ (5.5), which can be used alone or in mixture.

Inorganic particles having a Mohs' hardness of about 8 or more are most preferred. When relatively soft inorganic particles having a Mohs' hardness of 5 or less are used, inorganic particles readily separate from a magnetic layer, whereby head gap bridging readily occurs and running durability decreases.

The content of inorganic particles is generally from about 0.1 to 20 parts by weight, and preferably from about 1 to 10 parts by weight, based on 100 parts by weight of ferromagnetic particles.

It is also preferred that carbon black having an average particle diameter of from about 10 to 300 m$\mu$ be included in a magnetic layer in addition to the above inorganic particles.

Further, polyisocyanate compounds can be added upon preparing a magnetic layer of a magnetic recording medium of the present invention, including polyisocyanate compounds used for preparing polyurethane type resins.

The polyisocyanates used in the present invention include di-, tri- and tetraisocyanates selected from aliphatic compounds, aromatic compounds and alicyclic compounds having 2 or more —N═C═O groups in a molecule.

The method for preparing a magnetic recording medium of the present invention will be illustrated with reference to the addition of the above-described fatty acid derivatives and long chain fatty acids to a magnetic coating composition.

At first, ferromagnetic particles, binders, the above-described fatty acid derivatives and long chain fatty acids, and if desired, fillers and additives are mixed and kneaded with solvents to prepare a magnetic coating composition. The solvents used for mixing and kneading can be any of those that are commonly used for preparing a magnetic coating composition.

The methods of mixing and kneading are not particularly limited, and the order of adding each component can be optionally determined.

For preparing a magnetic coating composition, commonly used mixing and kneading machine such as a two-rod roll mill, a three-rod roll mill, a ball mill, a pebble mill, a Trommel, a sand grinder, Szegvari, an attritor, a high speed impeller dispersing machine, a high speed stone mill, a high speed impact mill, a Disper, a kneader, a high speed mixer, a homogenizer or an ultrasonic dispersing machine can be used.

Well known additives such as dispersing agents, antistatic agents or lubricating agents can also be added in combination upon preparing a magnetic coating composition.

Examples of dispersing agents are commonly used agents such as lecithin.

The dispersing agents are used in an amount of from about 0.1 to 10 parts by weight based on 100 parts by weight of ferromagnetic particles.

Examples of antistatic agents include electroconductive particles such as carbon black or carbon black graft polymer; natural surface active agents such as saponin; cationic surface active agents such as higher alkyl amines, quaternary ammonium salts, pyridine and the salts of heterocyclic compounds, phosphonium salts or sulfonium salts; anionic surface active agents such as phosphonate, phosphate, phosphoric acid esters, sulfonate, sulfate, sulfuric acid esters; and amphoteric surface active agents such as amino acids, aminosulfonic acids, sulfates or phosphates of amino alcohols. When the above electroconductive particles are used as antistatic agents, they are used in an amount of, for example, from about 0.1 to 10 parts by weight based on 100 parts by weight of ferromagnetic particles. When the surface active agents are used as antistatic agents, they are used in an amount of from about 0.12 to 10 parts by weight based on 100 parts by weight of ferromagnetic particles.

It should be understood that the description regarding the functions and effects of the above additives, such as dispersing agents or antistatic agents, is only exemplary and should not be interpreted to be limitative. For example, a dispersing agent may function as a lubricating agent or an antistatic agent. It should be understood that the above classification of the additives due to their functions is not decisive. Accordingly, if additives having multiple functions are used, the additive amounts thereof should preferably be determined in light of their multiple effects.

The resulting magnetic coating composition is coated on the above-described non-magnetic support. The coating composition can be coated directly on the non-magnetic support or can be coated through an adhesive layer.

Suitable conventional methods for coating the magnetic layer on a non-magnetic support include, for example, an air doctor coating method, a blade coating method, a rod coating method, an extruding coating method, an air knife coating method, a squeeze coating method, a dip coating method, a reverse roll coating method, a transfer roll coating method, a gravure coating method, a kiss coating method, a cast coating method, a spray coating method and a spin coating method, but other methods can also be used.

The dispersing methods and the coating methods are disclosed in detail in Japanese Patent Application (OPI) Nos. 46011/79 and 21805/79.

The thus-prepared magnetic layer has a dry thickness of from about 0.5 to 10 μm and preferably from about 1.5 to 7.0 μm.

When the magnetic recording medium is a recording tape, the magnetic layer thus provided on the non-magnetic support is generally subjected to magnetic orientation for orientating ferromagnetic particles contained in the magnetic layer, and then dried, and if necessary, subjected to surface smoothing treatment. The surface treated magnetic recording medium is then cut to a desired shape.

The present invention is illustrated in detail by the following Examples, but is not to be construed as being limited thereto. In Examples, all parts are by weight.

EXAMPLE 1

Composition 1 for a magnetic coating solution

|  | parts |
| --- | --- |
| Ferromagnetic iron particles (specific surface area: 45 m²/g) | 100 |
| Copolymer of vinyl chloride and vinyl acetate (i.e., polar group containing vinyl chloride resin A shown in Table 2 below) | 10 |
| Polyurethane resin (butylene adipate type, number average molecular weight: about 50,000) | 10 |
| Abrasive agent (α-alumina having an average particle diameter of 0.2 μm) | 5 |
| Additives (names and additive amounts are shown in Table 1) | |
| Carbon black (average particle diameter: about 40 mμ (nm)) | 2 |
| Methyl ethyl ketone | 300 |

Composition 2 for a magnetic coating solution

|  | parts |
| --- | --- |
| Ferromagnetic γ-Fe$_2$O$_3$ particles (specific surface area: 50 m²/g) | 130 |
| Copolymer of vinyl chloride and vinyl acetate (weight ratio: 90/10, degree of polymerization: 400) | 10 |
| Polyurethane resin (i.e., polyurethane type resin A shown in Table 2 below) | 10 |
| Abrasive agent (α-alumina having an average particle diameter of 0.2 μm) | 5 |
| Additives (names and additive amounts are shown in Table 1) | |
| Carbon black (average particle diameter: about 40 mμ (nm)) | 2 |
| Methyl ethyl ketone | 300 |

The above two compositions were separately dispersed in a ball mill for 48 hours and 5 parts of polyisocyanate was added to each and further mixed and dispersed for 1 hour and filtered through a filter having an average pore diameter of 1 μm to prepare a magnetic coating solution. Each thus-obtained magnetic coating solution as coated on a polyethylene terephthalate support having 10 μm thickness to obtain a magnetic layer of a dry thickness of 4.0 μm.

The non-magnetic supports thus coated with a magnetic coating solution were subjected to magnetic orientation using magnets of 3,000 gauss while the magnetic solution was still wet, and then dried, treated by supercalendering and slit to a ½ inch width to prepare a video tape.

The gloss on the surface of the magnetic layer after calendering was evaluated as a standard of dispersibility of magnetic particles. The thus-obtained video tapes were mounted on a VHS video tape recorder (VTR) having a circuit and a head modified to permit recording electric current to be applied for both a metal tape and a $\gamma$-$Fe_2O_3$ tape, and signals at 6 MHz were recorded and reproduced. The S/N ratios of each sample were measured, assuming that the S/N ratio of a standard video tape (a sample of Comparative Example 1) at reproduction was 0 dB.

Head gap bridging on the same VTR as above was evaluated under low humidity conditions at 20° C. and 10% RH in terms of occurrences of head gap bridging per 1 hour of running.

When a video tape was wound around a stainless steel pole with a contact angle of 180° and a tension ($T_1$) of 50 g, the tension ($T_2$) necessary for the video tape to run at a rate of 3.3 cm/s was measured. The friction coefficient $\mu$ of the video tape was calculated by the following equation based on the measured values:

$$\mu = \frac{1}{\pi} \cdot \ln\left[\frac{T_2}{T_1}\right]$$

The friction coefficient was evaluated by determining the $\mu$ value of a virgin surface on the first pass (initial $\mu$ value) and the $\mu$ value measured after 2,000 passes at low humidity and low temperature, i.e., 10° C. and 15% RH ($\mu$ value after running). In each case, $\mu$ values were measured at 23° C. and 70% RH.

The squareness ratios of the B-H characteristics in a running direction of a magnetic layer were measured.

TABLE 1

| Sample No. | Composition for magnetic coating solution | Compounds added | Additive amount parts | Gloss | S/N ratio (dB) | Clogging at low humidity | Initial μ value | μ value after running | Squareness ratio |
|---|---|---|---|---|---|---|---|---|---|
| 1-1 | 1 | $\left(\begin{array}{l}H_3C(CH_2)_{16}CO(OCH_2CH_2)_2O-C_4H_9 \text{ (Compound 1)}\\ H_3C(CH_2)_{16}COOH\end{array}\right.$ | 3<br>1 | 250 | +6.5 | 0 | 0.25 | 0.24 | 0.90 |
| 1-2 | 2 | $\left(\begin{array}{l}H_3C(CH_2)_{16}CO(OCH_2CH_2)_2OC_4H_9 \text{ (Compound 1)}\\ H_3C(CH_2)_{16}COOH\end{array}\right.$ | 3<br>1 | 220 | +2 | 0 | 0.27 | 0.29 | 0.90 |
| 1-3 | 2 | $\left(\begin{array}{l}H_3C(CH_2)_{14}CO(OCH_2CH_2)_2OCH_3 \text{ (Compound 13)}\\ H_3C(CH_2)_{18}COOH\end{array}\right.$ | 1<br>1 | 220 | +2 | 0 | 0.28 | 0.29 | 0.85 |
| 1-4 | 1 | $\begin{array}{l}H_3C(CH_2)_{16}\overset{\overset{O}{\|}}{C}+OCH_2CH_2)_2-O(CH_2)_3CH_3 \text{ (Compound 1)}\\ H_3C(CH_2)_{14}\overset{\overset{O}{\|}}{C}+OCH_2CH_2)_2-O-(CH_2)_3CH_3 \text{ (Compound 2)}\\ H_3C(CH_2)_{16}COOH\end{array}$ | 1.5<br>1.5<br>1 | 260 | +7 | 0 | 0.22 | 0.22 | 0.90 |
| 1-1* | 2 | $H_3C(CH_2)_{16}CO(OCH_2CH_2)_2OC_4H_9$ (Compound 1) | 4 | 170 | ±0 | 10 to 20 | 0.30 | 0.45 | 0.76 |
| 1-2* | 2 | $\left(\begin{array}{l}H_3C(CH_2)_{16}CO(OCH_2CH_2)_2O-C_4H_9 \text{ (Compound 1)}\\ \text{Olive oil}\end{array}\right.$ | 3<br>1 | 160 | −0.5 | 15 to 30 | 0.31 | 0.42 | 0.75 |
| 1-3* | 1 | $H_3C(CH_2)_{16}CO(OCH_2CH_2)_2O-C_4H_9$ (Compound 1) | 4 | 190 | +2 | 0 | 0.27 | 0.45 | 0.79 |

*comparative samples

It is clearly seen from the results of Table 1 that a magnetic recording medium containing fatty acid derivatives represented by formula (I) and a long chain fatty acid exhibits excellent electromagnetic characteristics. Not only are their electromagnetic properties excellent, but video head gap bridging does not take place at low humidity, and the friction coefficient does not increase after repeated running. Particularly when ferromagnetic metal particles are used as magnetic particles, a magnetic recording medium having high practical value can be obtained, since the magnetic recording medium has high squareness ratio, excellent S/N due to a smooth surface and greatly reduced increase of friction coefficient after repeated running.

EXAMPLE 2

Composition for a magnetic coating solution

|  | parts |
|---|---|
| Magnetic particles (shown in Table 2) | |
| in case of γ-Fe₂O₃ | 100 |
| in case of Fe | 140 |
| Vinyl chloride type resin (shown in Table 2) | 10 |
| Polyurethane resin (shown in Table 2) | 8 |
| Abrasive agent (α-alumina having an average particle diameter of 0.2 μm) | 10 |
| Additives (shown in Table 2) | 3 |
| Carbon black (average particle diameter: about 40 mμ) | 2 |
| Methyl ethyl ketone | 300 |

The above composition was mixed, kneaded and dispersed in a ball mill for 48 hours, and then 10 parts of polyisocyanate was added thereto and the mixture was mixed, kneaded and dispersed for 1 hour and then filtered using a filter having 1 μm average pore diameter to prepare a magnetic coating solution. The thus obtained magnetic coating solution was coated on the surface of a polyethylene terephthalate support having a thickness of 10 μm to obtain a magnetic layer of a dry thickness of 4.0 μm.

The non-magnetic support thus coated with a magnetic coating solution was subjected to magnetic orientation while it was still wet using magnets of 3,000 gauss and then dried, treated by supercalendering and slit to a ½ inch width to prepare a video tape.

The thus obtained tape was mounted on a VHS VTR ("VN8200", a trade name, manufactured by Matsushita Electric Industrial Co., Ltd.) and recording and reproduction were conducted at a 1 hour length type under high humidity conditions, i.e., 25° C. and 80% RH. During that time, video head gap bridging was evaluated in terms of the occurrences of head gap bridging of the video head per hour.

For evaluation of the runnability of the tape, when a video tape was wound around a stainless steel pole with a tension ($T_1$) of 50 g and with a winding angle of 180°, the tension ($T_2$) necessary for the video tape to run at a rate of 3.3 cm/s was measured. Based on the measured values, the friction coefficient μ of a video tape was calculated by the following equation.

$$\mu = \frac{1}{\pi} \cdot \ln\left[\frac{T_2}{T_1}\right]$$

Tests of friction coefficient were conducted at 25° C. and 80% RH. The initial friction coefficient and the friction coefficient on the same surface as above after 300 passes were measured using a measuring device for friction coefficient.

Tests as to still durability were conducted on all samples at a high temperature, i.e., 50° C. and 70% RH, and all samples exhibited still durability of 60 minutes or more without any difference between samples.

TABLE 2

| Sample No. | Magnetic particles | Vinyl type resin | Urethane type resin | Additives | Clogging at high humidity | Friction coefficient | Friction coefficient after 300 passes |
|---|---|---|---|---|---|---|---|
| 2-1 | A | A | B | A | 0 | 0.20 | 0.20 |
| 2-2 | A | C | A | A | 0 | 0.20 | 0.20 |
| 2-3 | A | A | A | A | 0 | 0.21 | 0.21 |
| 2-4 | B | A | B | A | 0 | 0.25 | 0.26 |
| 2-5 | B | B | A | A | 0 | 0.24 | 0.24 |
| 2-6 | B | A | A | A | 0 | 0.26 | 0.26 |
| 2-7 | B | A | C | A | 0 | 0.24 | 0.25 |
| 2-1* | A | A | A | B | 10 to 20 | 0.42 | 0.6 or more |
| 2-2* | B | C | A | B | 20 to 40 | 0.42 | 0.53 |
| 2-3* | A | B | B | A | 15 to 30 | 0.39 | 0.52 |

TABLE 2-continued

| Sample No. | Magnetic particles | Vinyl type resin | Urethane type resin | Additives | Clogging at high humidity | Friction coefficient | Friction coefficient after 300 passes |
|---|---|---|---|---|---|---|---|
| 2-4* | B | B | B | A | 15 to 30 | 0.36 | 0.49 |

*comparative examples

Magnetic particles:
A: Ferromagnetic $\gamma$-$Fe_2O_3$ particles (specific surface area: 50 $m^2/g$)
B: Ferromagnetic metal (Fe) particles (specific surface area: 50 $m^2/g$)

Vinyl type resin:
A: Polar group containing vinyl chloride resin (polymerization degree: 310) (vinyl chloride: 77 wt %, sulfate group: 0.8 wt %, epoxy group: 3.9 wt %, hydroxyl group: 0.5 wt %)
B: Copolymer of vinyl chloride, vinyl acetate and vinyl alcohol (polymerization degree: 400) (vinyl chloride: 80 wt %, vinyl acetate: 15 wt % and vinyl alcohol: 5 wt %)
C: Copolymer of vinyl chloride and vinyl acetate (polymerization degree: 400) (vinyl chloride: 75 wt % and vinyl acetate: 25 wt %)

Polyurethane type resin:
A: Polyester type polyurethane containing both open ring type and condensed type polyester (weight average molecular weight: 40,000 (having an average of two $SO_3Na$ groups per molecule), number average molecular weight: 25,000, initial modulus of elasticity: 100 $kg/mm^2$, breaking strength: 8 $kg/mm^2$, and breaking elongation: 150%)
B: Polyester type polyurethane having both open ring type and condensed type polyester (weight average molecular weight: 40,000, number average molecular weight: 25,000, initial modulus of elasticity: 100 $kg/mm^2$, breaking strength: 8 $kg/mm^2$, and breaking elongation: 150%)
C: Polyester type polyurethane having both open type and condensed type polyester (weight average molecular weight: 40,000 (having 1.5 —COOH groups per molecule), number average molecular weight: 25,000, initial modulus of elasticity: 100 $kg/mm^2$, breaking strength: 9 $kg/mm^2$, and breaking elongation: 130%)

Additives:
A: Compound 1 [$CH_3(CH_2)_{16}CO(OCH_2CH_2)_2O$—$C_4H_9$] + stearic acid + oleic acid (weight ratio of three components = 60/20/20)
B: $CH_3(CH_2)_{16}COOC_4H_9$ + stearic acid + oleic acid (weight ratio of three components = 60/20/20)

As is apparent from the results, the fatty acid derivatives represented by formula (I) are effective for improving durability at a high temperature, but when the fatty acid derivatives are used in combination with binders having no polar group, the problem of head gap bridging occurs at high humidity. Even when binders having a polar group are used, the problem of head gap bridging often occurs at a high humidity when a fatty acid alkyl ester commonly and widely used as a lubricating agent is used. In contrast, in accordance with the magnetic recording medium of the present invention, durability can be maintained at a high temperature and head gap bridging does not take place at a high humidity.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer containing (a) ferromagnetic particles; (b) a binder containing at least one resin substituted with at least one polar group selected from an —$SO_3M$ group, a —COOM group, an —$OSO_3M$ group, an

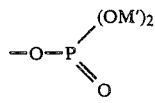

group and a

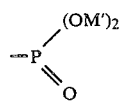

group, wherein M represents H, Li, Na or K and M' represents H, Li, Na, K or an alkyl group; and (c) at least one fatty acid lubricating agent comprising at least one fatty acid derivative represented by formula (I):

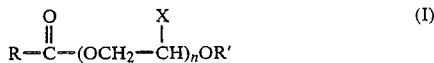

wherein
R represents a hydrocarbon group having from 11 to 21 carbon atoms;
X represents hydrogen or a methyl group;
R' represents a hydrocarbon group having from 1 to 8 carbon atoms; and
n is the integer of from 2 to 20, wherein said magnetic layer further contains a long chain fatty acid and wherein the total amount of said fatty acid derivative and said long chain fatty acid is from about 0.1 wt % to 10.0 wt % based on said ferromagnetic particles, and the weight ratio of said fatty acid derivative to said long chain fatty acid is from about 70/30 to 10/90.

2. The magnetic recording medium as claimed in claim 1, wherein said ferromagnetic particles are ferromagnetic metal particles having a specific surface area $S_{BET}$ of 45 $m^2/g$ or more.

3. The magnetic recording medium as claimed in claim 1, wherein R represents a saturated straight chain hydrogen group; X represents hydrogen; and n is an integer of from 2 to 4.

4. The magnetic recording medium as claimed in claim 1, wherein said fatty acid lubricating agent is selected from the group consisting of the following compounds 1 to 13:

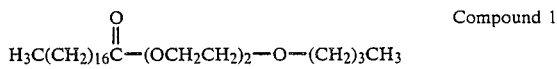

Compound 1

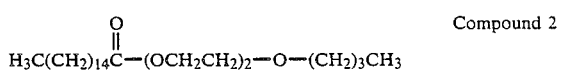

Compound 2

-continued

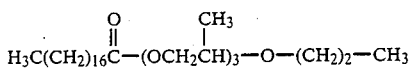
Compound 3

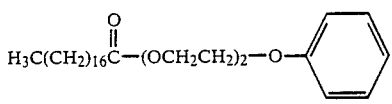
Compound 4

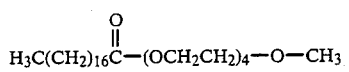
Compound 5

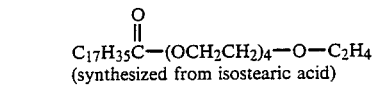
Compound 6
(synthesized from isostearic acid)

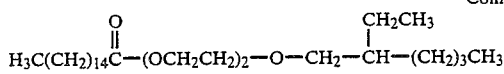
Compound 7

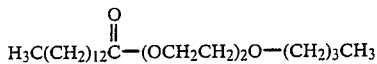
Compound 8

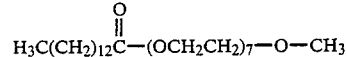
Compound 9

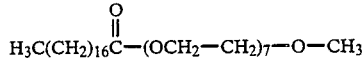
Compound 10

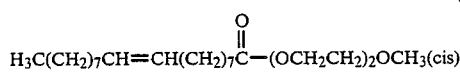
Compound 11

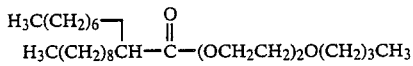
Compound 12

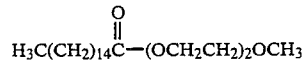
Compound 13

5. The magnetic recording medium as claimed in claim 1, wherein said long chain fatty acid contains from 11 to 32 carbon atoms.

6. The magnetic recording medium as claimed in claim 2, wherein said long chain fatty acid contains from 12 to 22 carbon atoms.

7. The magnetic recording medium as claimed in claim 1, wherein said long chain fatty acid is a saturated fatty acid.

8. The magnetic recording medium as claimed in claim 1, wherein the total amount of said fatty acid derivative and said long chain fatty acid is from about 0.05 wt % to 6 wt % based on said ferromagnetic particles, and the weight ratio of said fatty acid derivative to said long chain fatty acid is from about 70/30 to 30/70.

9. The magnetic recording medium as claimed in claim 1, wherein said resin is a polyurethane resin, a vinyl chloride copolymer, or a polyester resin.

10. The magnetic recording medium as claimed in claim 9, wherein said vinyl chloride copolymer is a copolymer of a repeating unit of vinyl chloride, a repeating unit having an epoxy group and a repeating unit having said polar group.

11. The magnetic recording medium as claimed in claim 10, wherein said vinyl chloride copolymer comprises from about 0.01 to 5.0 mol % of said repeating unit having said polar group, and from about 1.0 to 30 mol % of said repeating unit having said epoxy group, said repeating unit having said epoxy group being present in an amount of from about 0.01 to 0.5 mol per mol of the repeating unit of vinyl chloride.

12. The magnetic recording medium as claimed in claim 10, wherein said vinyl chloride copolymer comprises from about 0.5 to 3.0 mol % of said repeating unit having said polar group, and from about 1 to 20 mol % of said repeating unit having said epoxy group, said repeating unit having said epoxy group being present in an amount of from about 0.01 to 0.3 mol per mol of the repeating unit of vinyl chloride.

13. The magnetic recording medium as claimed in claim 10, wherein said polar group is $-SO_3Na$.

14. The magnetic recording medium as claimed in claim 9, wherein said resin is a polyurethane resin containing from about 0.01 to 5 mol % of repeating units having said polar group.

15. The magnetic recording medium as claimed in claim 14, wherein said resin is a polyurethane resin containing from about 0.1 to 2.0 mol % of repeating units having said polar group.

16. The magnetic recording medium as claimed in claim 1, wherein said polar group is present in an amount of from about $1 \times 10^{-5}$ to $100 \times 10^{-5}$ mol/g of said binder.

17. The magnetic recording medium as claimed in claim 1, wherein said binder is present in an amount of from about 10 to 100 parts by weight per 100 parts by weight of said ferromagnetic particles.

* * * * *